July 5, 1927.
M. A. GAINES
EDUCATIONAL DEVICE
Filed June 23, 1926   2 Sheets-Sheet 1
1,634,713
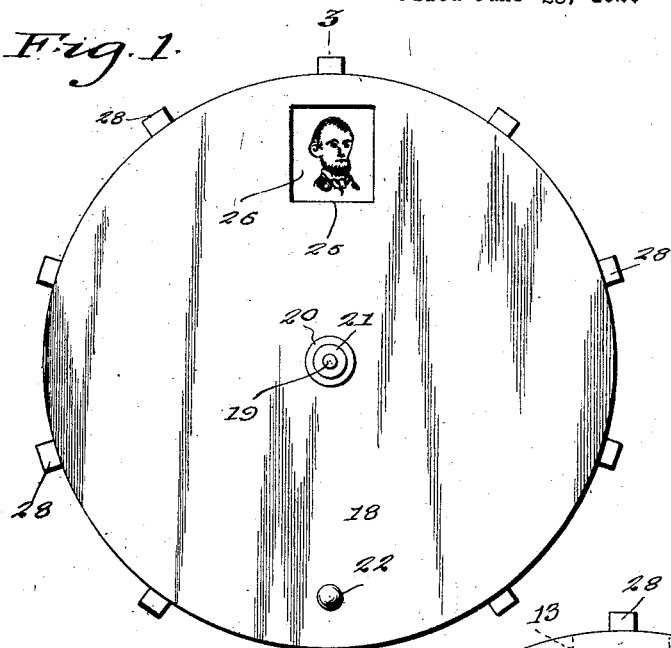
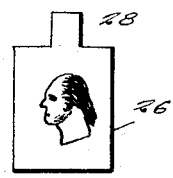
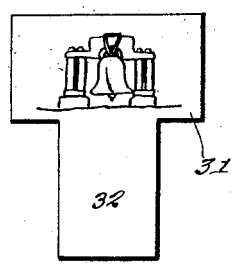
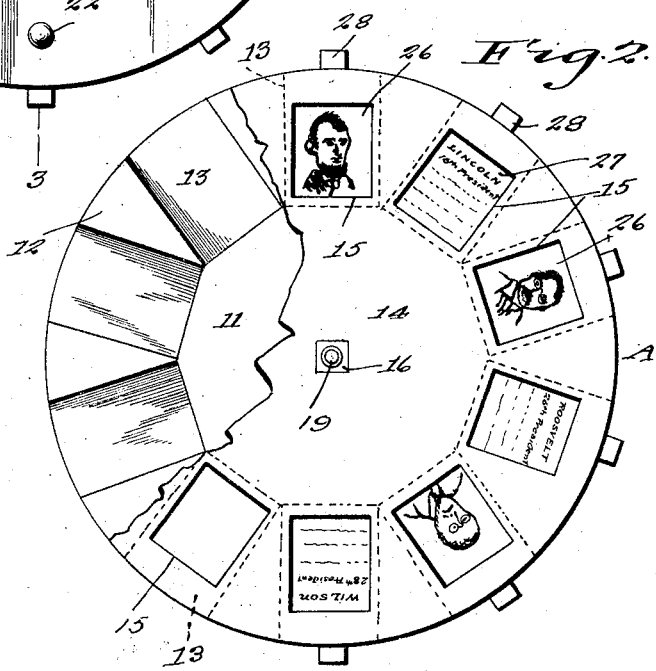
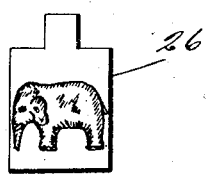
Inventor
Mildred A. Gaines
By Arthur C. Welch
Attorney July 5, 1927.
M. A. GAINES
EDUCATIONAL DEVICE
Filed June 23, 1926   2 Sheets-Sheet 2
1,634,713
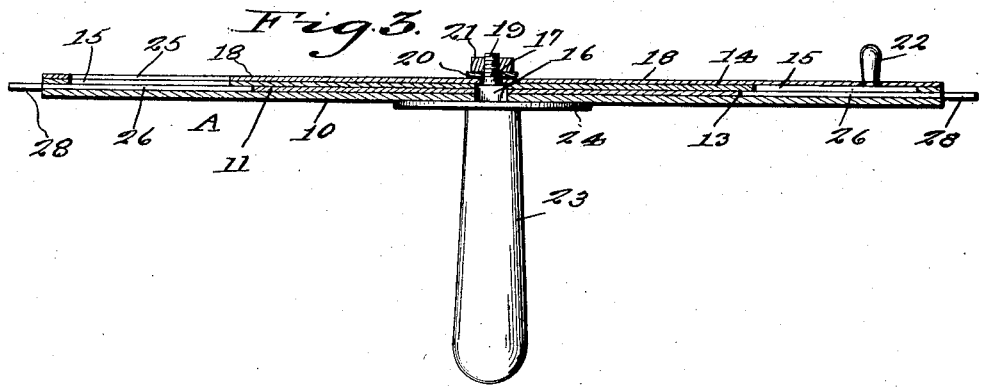
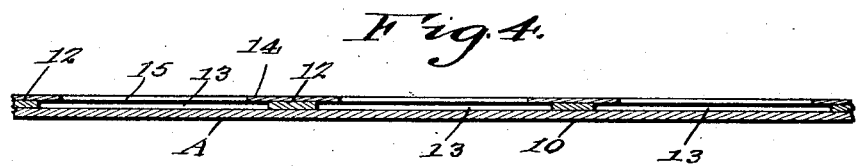
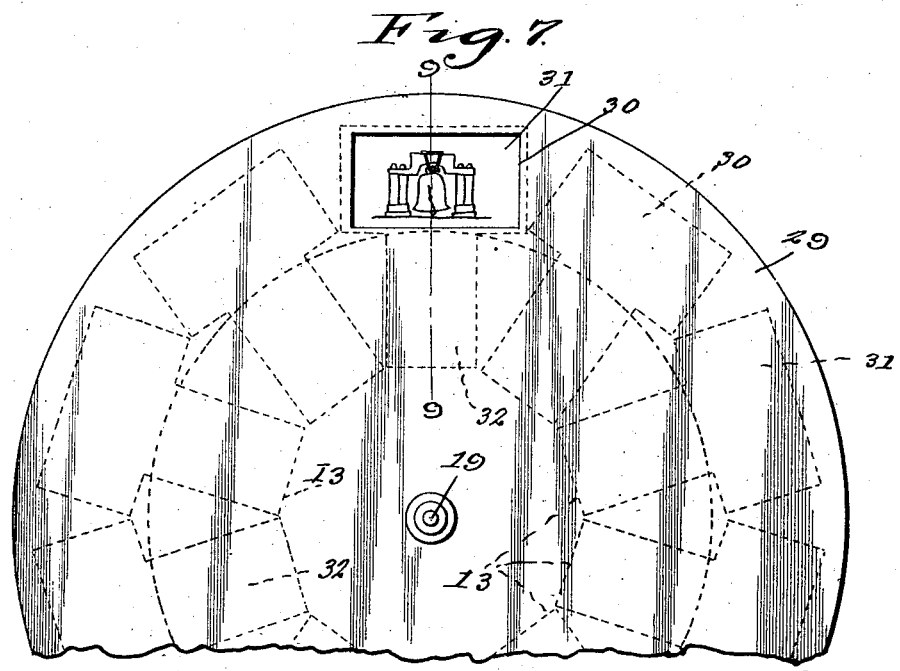
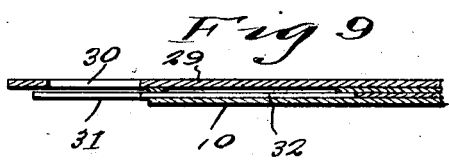
Inventor
Mildred A Gaines
By Arthur C. Welch.
Attorney Patented July 5, 1927.

1,634,713

UNITED STATES PATENT OFFICE.

MILDRED A. GAINES, OF FARMVILLE, VIRGINIA.

EDUCATIONAL DEVICE.

Application filed June 23, 1926. Serial No. 117,900.

This invention relates to educational devices and has for an object the provision of a device of simple construction and use, which will provide a source of instruction, as well as means for testing memory, and will in addition prove interesting, instructive and attractive, to children of various ages, as well as adults.

Another object of the invention is the provision of a device, which in addition to the above and other advantages, may be arranged to deal with different subjects and thus impart a wide variety of information, and thus adapt it to the age of the person or persons using the device.

With the above and other objects in view, the invention further includes the following novel features and details of construction, to be hereinafter more fully described, illustrated in the accompanying drawings and pointed out in the appended claims.

In the drawings:—

Figure 1 is a plan view of the invention.

Figure 2 is a plan view with the cover disk removed and parts broken away.

Figure 3 is an enlarged sectional view taken substantially on the line 3—3 of Figure 2.

Figure 4 is an enlarged fragmentary section taken transversely through several of the pockets, the cover disk being removed.

Figure 5 is a detail view of one of the removable cards.

Figure 6 is a plan view of another card.

Figure 7 is a fragmentary plan view illustrating a slightly different arrangement of the invention.

Figure 8 is a detail plan view of one of the cards used in Figure 7.

Figure 9 is a fragmentary section taken substantially on the line 9—9 of Figure 7.

Referring to the drawings in detail wherein like characters of reference denote corresponding parts, the invention comprises a body indicated generally at A and shown circular in form, but it is obvious that it is not essential to restrict the body to this particular shape. The body comprises a disk-like base 10 upon which is mounted a relatively small central disk 11 having wedge-shaped projections 12 extending therefrom. These projections may be separately formed or made integral with the disk 11 and act together with the said disk 11 to form radially extending pockets 13. Mounted upon the disk 11 and the wedge-shaped extensions 12 is a disk 14 which is provided with spaced openings 15, the latter overlying the pockets 13. The pockets thus open at the peripheries of the disks and have one of their walls provided with the openings 15 which form sight openings. The construction just described forms the body A.

Extending through the body A is a post which is provided with a rectangular portion 16 which is received within a similarly shaped opening provided concentrically in the body A. The post is further provided with a round portion 17 and mounted upon this round portion is a disk-like cover 18. A threaded extension 19 is provided upon the post for the reception of a washer 20 and nut 21, so that the cover 18 is rotatably and removably mounted on the post. A handle 22 may be provided for rotating the cover. The post just described extends from a handle 23, at the inner end of which there is provided a disk 24 upon which the base 10 rests. The cover 18 is provided with a single opening 25 which is adapted to be moved into and out of register with the sight openings 15 so as to expose the contents of the pockets, the remainder of the pocket openings being closed by the disk 18.

Adapted to be removably positioned within the pockets 13 are cards 26 and 27, each of which is provided with a tab 28. The cards 26 may be referred to as picture cards in that they are designed to contain pictures of illustrations, while the cards 27 may be referred to as descriptive cards, in that they are designed to contain descriptions of the matter shown on the picture cards. The cards 26 and 27 are adapted to be arranged in alternate pockets and may be removably positioned therein, the tabs 28 providing convenient means for this purpose. By this arrangement, the picture cards are adapted to have their descriptive cards arranged adjacent so that when the opening 25 of the cover 18 is positioned over a picture card, the latter may be studied and the cover 18 then moved to position to disclose the particular descriptive card relating to the picture card just viewed, while the latter will be concealed. This is clearly illustrated in Figures 1 and 2 of the drawings. In the first mentioned figure a picture of President Lincoln is shown and a child or other student may study the picture, or may be questioned as to the events prominent in President Lincoln's life. The cover 18 is then rotated to disclose the card 27 relating to the picture just shown and this card will contain data relative to the life of President Lincoln. If desired, the description card may first be studied and subsequently covered and the picture card of President Lincoln disclosed and the student may then by viewing this card recall the events set forth on the description card. Cards containing various information may be placed within the pockets, the information being in accordance with the age and ability of the student. For example, cards containing the pictures of animals such as is illustrated in Figure 6 may be used.

In order to increase the usefulness of the device, the cover plate 18 may be removed and a cover plate 29 substituted. This cover plate 29 is provided with a single opening 30 which is designed to be moved so as to disclose matter arranged upon cards 31. One of these cards is shown in Figure 8 of the drawings and is substantially T-shaped, the stem 32 being of a size to be removably received within any one of the pockets 13 with the picture portion extending beyond the periphery of the body A so as to be within the opening 30 of the cover 29. As previously described, the cards 31 may be arranged so that every other card will be a picture card and each alternate card a description card. By increasing the size of the cards, subjects of a more complicated character may be displayed and additional information imparted by means of the description cards.

The invention is susceptible of various changes in its form, proportions and minor details of construction and the right is herein reserved to make such changes as properly fall within the scope of the appended claims.

Having described the invention what is claimed is:—

1. An educational device comprising a body having circumferentially spaced pockets therein, cards adapted to be removably positioned within the pockets and having indicia thereon, and a cover movably mounted upon the body and having an opening therein arranged to singly disclose the spaced indicia.

2. An educational device comprising a substantially circular body having pockets extending inwardly from its periphery, cards adapted to be removably positioned within the pockets and having indicia thereon, and a cover rotatably mounted upon the body and having an opening therein arranged to singly disclose the spaced indicia.

3. An educational device comprising a substantially circular body having circumferentially spaced pockets extending inwardly from its periphery, cards adapted to be removably positioned within the pockets, certain of said cards having pictures thereon and other cards having descriptive matter relating to the pictures and the cards being arranged within the pockets with a picture card and its related description arranged in juxtaposition and a cover rotatably mounted upon the body and having an opening therein arranged to singly disclose the cards.

4. An educational device comprising a circular body including a solid base, a rotatably mounted cover and means rigid with the base and positioned between the base and cover to provide a plurality of radially disposed pockets having their openings at the periphery of said body and having one of their walls provided with sight openings, cards adapted to be removably positioned within the pockets and having indicia thereon, and said cover having a single opening therein adapted to be moved into register with the sight openings of the pockets to singly disclose the cards.

In testimony whereof I affix my signature.

MILDRED A. GAINES.